United States Patent [19]

Skanberg et al.

[11] Patent Number: 5,582,806
[45] Date of Patent: Dec. 10, 1996

[54] GAS GENERATOR

[75] Inventors: Torbjorn Skanberg, Hovas; Yngve Haland, Falsterbo, both of Sweden

[73] Assignee: Autoliv Development AB, Vargarda, Sweden

[21] Appl. No.: 297,553

[22] Filed: Aug. 26, 1994

[30] Foreign Application Priority Data

Aug. 26, 1993 [GB] United Kingdom .................. 9317787

[51] Int. Cl.$^6$ .............................. B01J 7/00; B60R 21/26; B60R 21/32
[52] U.S. Cl. .................... 422/305; 280/735; 280/737; 280/741; 280/742; 422/107; 422/165; 422/166
[58] Field of Search .................................. 422/105, 107, 422/114, 165, 166, 199, 211, 305; 280/735, 737, 741, 742

[56] References Cited

U.S. PATENT DOCUMENTS

| | | | |
|---|---|---|---|
| 4,289,327 | 9/1981 | Okada | 280/737 |
| 5,345,876 | 9/1994 | Rose et al. | 280/737 X |
| 5,348,344 | 9/1994 | Blumenthal | 280/737 |
| 5,350,192 | 9/1994 | Blumenthal | 280/737 |

FOREIGN PATENT DOCUMENTS

| | | |
|---|---|---|
| 469515 | 7/1937 | United Kingdom . |
| 1578333 | 11/1980 | United Kingdom . |

*Primary Examiner*—Timothy McMahon
*Assistant Examiner*—Robert Carpenter
*Attorney, Agent, or Firm*—Spencer & Frank

[57] ABSTRACT

A gas generator for generating gas under pressure. The gas generator comprises a device for providing a first gas including a pressure vessel containing the first gas, the first gas being an oxidizing gas; a device for providing a second gas adapted to be oxidized by the first gas and including a pyrotechnic charge for generating the second gas when ignited. An oxidation zone of the gas generator includes an outlet, the first gas and the second gas being adapted to undergo an oxidation reaction in the oxidation zone for generating the gas under pressure. The first gas and the second gas are directed to the oxidation zone such that the oxidation zone contains a mixture of the first gas and the second gas for the oxidation reaction thereof, the second gas being of a sufficiently elevated temperature to initiate the oxidation reaction in the oxidation zone. A back-up catalytic device ensures initiation of the oxidation reaction of the mixture.

23 Claims, 3 Drawing Sheets

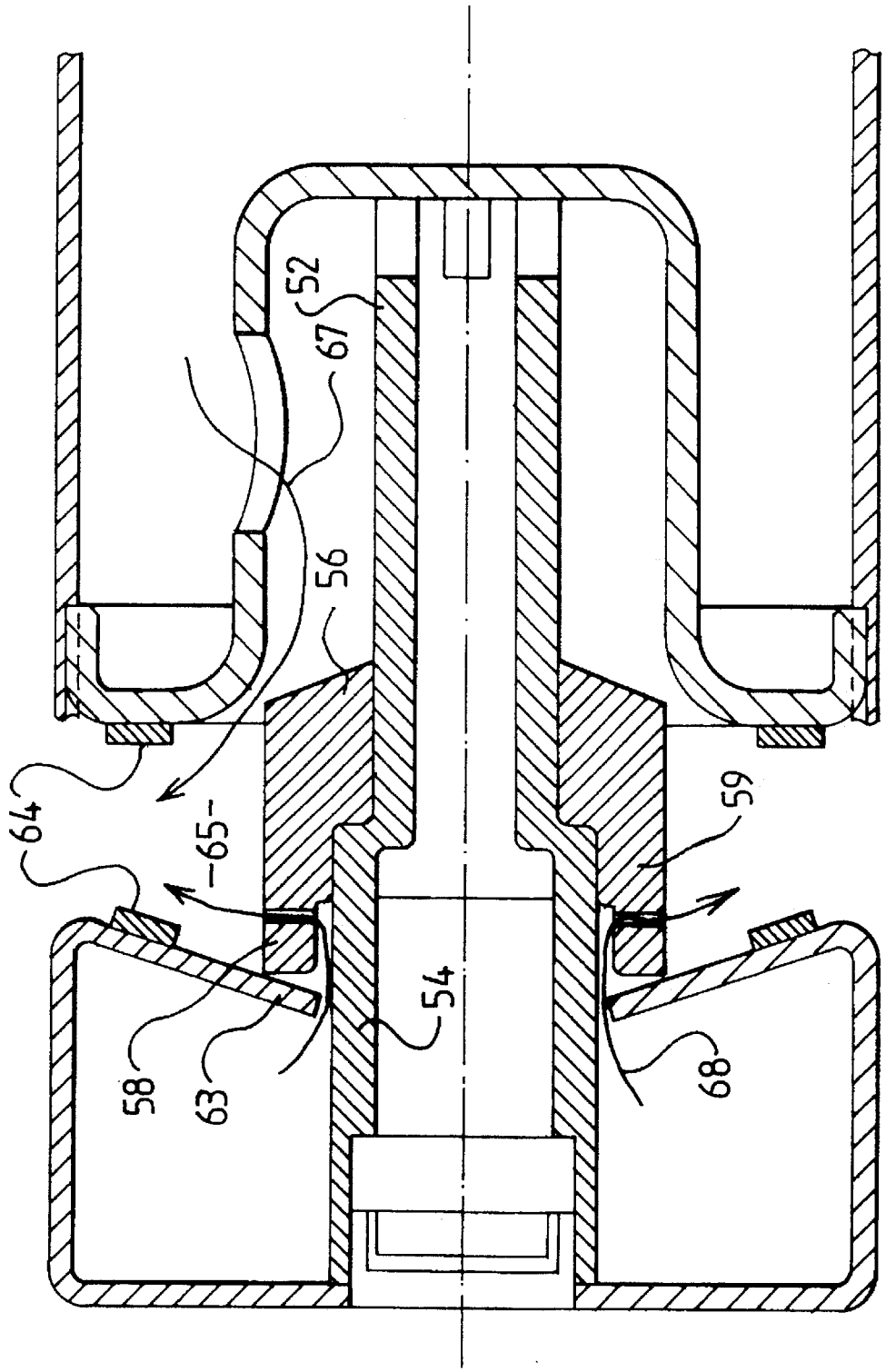

GAS GENERATOR

FIELD OF THE INVENTION

The present invention relates to a gas generator and more particularly relates to a gas generator adapted for use in inflating an air-bag in a motor vehicle.

BACKGROUND OF THE INVENTION

Various types of gas generator have been proposed for use in inflating an air-bag in a motor vehicle in the event that an accident arises.

It is important that the air-bag is inflated within a very brief period of time following the sensing of an accident. Consequently, it has been proposed to use various pyrotechnic materials in gas generators. Pyrotechnic materials are inherently dangerous, since a typical pyrotechnic material is "self-combusting". In other words, the material contains all the chemicals necessary for combustion to occur, and once combustion has been initiated, then that combustion will, in a very short period of time, be fully completed. Also the gas generated following ignition of a pyrotechnic material may contain poisonous gasses, such as carbonmonoxide, or potentially explosive gasses, such as hydrogen.

The object of the present invention is to provide an improved gas generator which is capable of generating gas very swiftly, but which is safe.

SUMMARY OF THE INVENTION

According to one aspect of this invention, there is provided a gas generator comprising means for providing a first, oxidizing, gas and a second gas adapted to be oxidized by said first gas, the gas generator comprising means, when the gas generator is activated, to direct the first gas and the second gas to an oxidation zone where the gases react, the oxidation zone having an outlet, catalytic means being provided associated with the oxidation zone to initiate the reaction between the mixed gases when the mixed gases are introduced to the oxidation zone.

The oxidizing gas may be oxygen, or a gas containing oxygen such as nitrous oxide. The second gas may comprise hydrogen, or a hydrocarbon such as methane or ethane, or may comprise carbonmonoxide. Typically, therefore, the oxidation reaction is a combustion reaction.

In one embodiment the first gas and the second gas are initially contained within a single pressure vessel.

Conveniently, additionally an inert gas, such as argon and/or helium is present within the pressure vessel.

In an alternative embodiment, the first gas and the second gas are initially contained in separate respective pressure vessels.

Preferably, additionally an inert gas, such as argon and/or helium, is present within each of the pressure vessels.

Conveniently, electrically controlled valve means are located between the pressure vessel or vessels and the oxidation zone, the valve means being adapted to be opened in response to an accident.

Alternatively, the gas generator comprises a pyrotechnic charge which when ignited generates said second gas, and a pressure vessel containing said first gas.

In such an embodiment, the pressure vessel may also contain an inert gas, such as argon and/or helium.

Conveniently, an electrically activated squib is provided to ignite the pyrotechnic charge, and or electrically actuated valve is provided between the pressure vessel and the oxidation zone, both the squib and the valve being adapted to be activated by a signal from a sensor.

According to another aspect of this invention, there is provided a gas generator comprising a first vessel containing a first gas and a second vessel containing a second gas, one of the gases containing oxygen and the other of the gases containing a gas adapted to combust with oxygen, the gas generator comprising means, when the gas generator is activated, to direct the two gases to a combustion zone where the gases combust, the combustion zone having an outlet, catalytic means being provided within the combustion zone to ignite the mixed gases when the mixed gases are introduced to the combustion zone.

It is to be understood, therefore, that in this embodiment no separately acting means is provided to ignite the gas mixture—instead the gas mixture is ignited by the catalyst. This facilitates the use of two separate gases which can be mixed and combusted within the combustion chamber. Since two separate gases are utilised, stored in separate vessels, there is not the risk of unintentional combustion that is associated with the use of a pyrotechnic material.

Preferably, the catalytic means comprise a catalytic inert metal, such as a metal selected from the group comprising platinum, osmium, iridium, palladium, rhodium and ruthenium, the preferred metal being platinum. The catalyst may be supported on a porous substrate such as alumina, asbestos or silica.

Advantageously, additionally a pyrotechnic or electric igniter is associated with the combustion zone to ensure ignition of the mixed gases.

Preferably, one vessel is provided with at least one outlet port comprising an aperture sealed by sealing means, there being a piston located adjacent and in supporting relationship with the sealing means adapted to support the sealing means. Moreover, means are provided to move the piston, when the gas generator is to be activated, to a position in which the piston no longer supports the sealing means, the pressure within the vessel breaking the sealing means or otherwise opening the aperture sealed by the sealing means, thus establishing a flow path to the combustion zone for gas in that vessel.

Advantageously, the part of the vessel that defines the sealed aperture or apertures is in the form of a reentrant well, the piston being mounted for sliding movement on a tubular member extending into the well, there being a flow path between the interior of the tubular member and the end face of the piston, the piston providing a substantial sliding sealing fit within the well. Moreover, a gas generating squib is provided to supply gas to the tubular member.

Conveniently, the squib is mounted within an end portion of the tubular member.

Advantageously the second vessel is mounted in position to surround part of the tubular member projecting from the re-entrant well.

Preferably, the piston is provided with a peripheral skirt having a plurality of transverse bores therethrough, the piston being adapted to deflect an end wall of the second vessel, thus opening a fluid flow path between the deflected end wall of the second vessel and part of the tubular member on which the second vessel is mounted. The flow path continues through the transverse bores provided in the skirt of the piston to the combustion zone.

Conveniently, the first vessel contains a mixture of inert gas and oxygen at a pressure of approximately 200 bar, and the second vessel contains hydrogen at a pressure of approximately 30 bar.

Advantageously, the inert gas is helium.

BRIEF DESCRIPTION OF THE DRAWINGS

In order that the invention may be more readily understood, and so that further features thereof may be appreciated, the invention will now be described, by way of example, with reference to the accompanying drawings in which:

FIG. 6 is a corresponding view showing the gas generator of FIG. 5 in use.

DETAILED DESCRIPTION OF THE INVENTION

Figure 1:
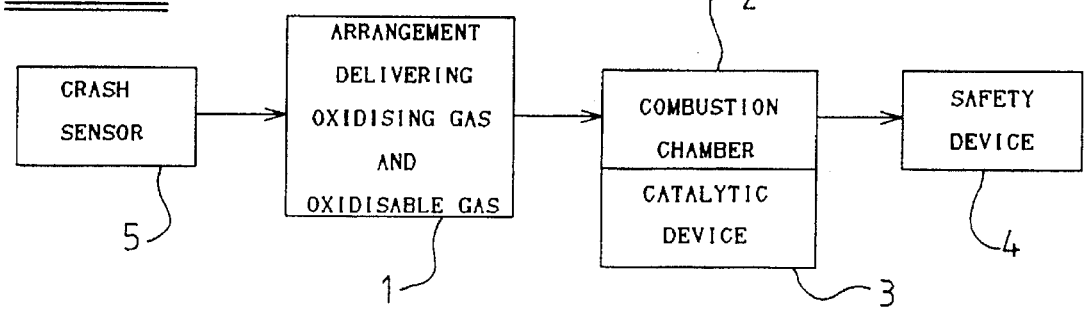
FIG. 1 is a block diagram illustrating the arrangement according to the invention.

Referring initially to FIG. 1, a gas generator in accordance with the invention comprises an arrangement 1 for delivering an oxidizable gas and an oxidizing gas to a combustion chamber 2. The combustion chamber 3 is associated with a catalytic device which facilitates or enables the oxidation of the oxidizable gas. Such oxidation is most frequently associated with the generation of heat. The oxidized gas passes from the combustion chamber to a safety device 4 provided in a motor vehicle such as an air-bag or a seat-belt pre-tensioner. The entire arrangement is activated by a crash sensor 5 which triggers operation of the arrangement for delivering the oxidizable gas and the oxidising gas.

As will become clear from the following description, many different detailed arrangements may be provided for delivering the oxidisable gas and the oxidising gas, but once the gases have passed through the combustion chamber 2, and combustion has been initiated by the catalytic device, the gas that is passed on to the safety device 4 does not contain any significant quantities of oxidizable gas such as carbonmonoxide or hydrogen.

Figure 2:
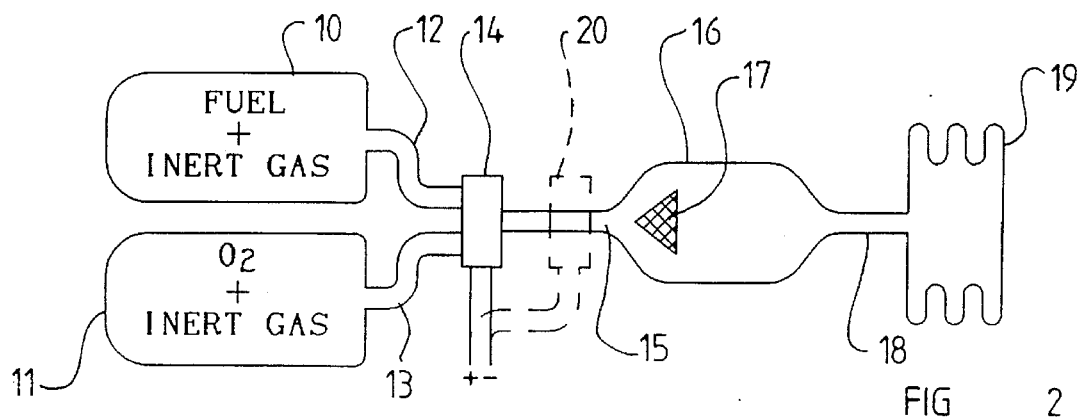
FIG. 2 is a schematic illustration of one embodiment of the invention.

Referring now to FIG. 2 of the accompanying drawings which illustrates one embodiment of the invention, the illustrated arrangement comprises a first pressure vessel 10 which contains fuel, such as hydrogen and inert gas. The inert gas may be argon, helium or a mixture of these gases. The arrangement includes a second pressure vessel 11 which contains oxygen admixed with an inert gas. The inert gas in the second pressure vessel 11 may also comprise argon, helium or a mixture of these gases.

The first pressure vessel 10 has an outlet 12 and the second pressure vessel 11 has an outlet 13, the outlets 12 and 13 being connected, through an electrically activated valve arrangement 14 to an inlet 15 of a combustion chamber 16. The electrically operated valve 14 has electric leads connected to a crash sensor, such as the crash sensor 5.

Contained within the combustion chamber 16 is a catalytic igniter 17. The catalytic igniter comprises a catalytic inert metal, such as a metal selected from a group comprising platinum, osmium, iridium, palladium, rhodium and ruthenium supported on a porous substrate such as alumina, asbestos or silica. The preferred metal is platinum. The catalyst may be in the form of a thin film provided on the porous substrate or may be present in the form of a block.

The combustion chamber 16 is provided with an outlet 18 which extends to a safety device in the form, in this example, of an air-bag 19.

Optionally, the inlet 15 to the combustion chamber 16 is provided with an electric or pyrotechnic igniter 20. In operation of the arrangement illustrated in FIG. 2, in the event that an accident should arise, the electrically actuated valve 14 is opened permitting the fuel mixed with inert gas from the first pressure vessel 10 and the oxygen mixed with inert gas from the pressure vessel 11 to flow through the inlet 15 into the combustion chamber 16. Oxidation of the fuel is then initiated by the operation of the catalytic igniter 17. If the optional pyrotechnic or electric igniter 20 is present, it will be activated in response to a signal from the crash sensor which opens the electrically activated valve 14. In such a case the catalytic igniter is primarily provided as a precautionary step, as a back-up which ensures ignition in cold weather or other adverse conditions.

It will be appreciated, however, that the fuel will be oxidized within the combustion chamber 16. This will increase the temperature of the gas and the chemical reaction of combustion may be such that at the end of the reaction, more molecules are present than were present at the commencement of the reaction, thus further increasing gas pressure. Gas at an elevated temperature and at a high pressure will flow through the outlet 18, thus rapidly inflating the air-bag 19. The gas entering the air-bag 19 will not contain significant quantities of carbon monoxide or hydrogen.

In the arrangement of FIG. 2, it is to be observed that the fuel and the oxygen are initially maintained in separate pressure vessels 10 and 11. There is thus virtually no risk of the fuel being ignited inadvertently.

Figure 3:
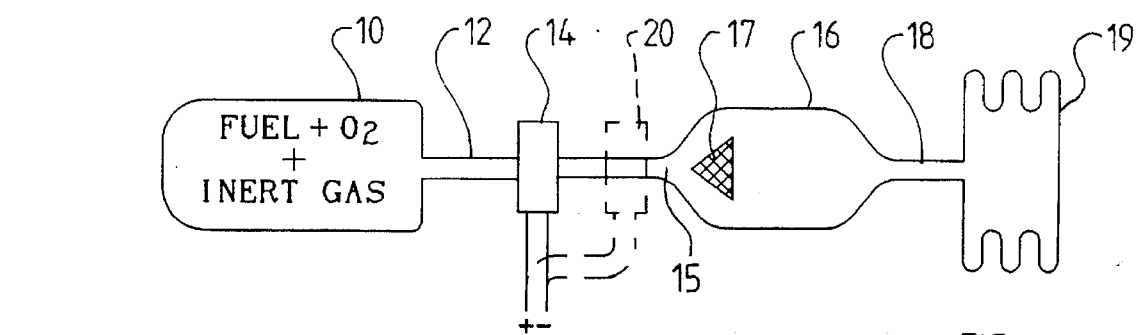
FIG. 3 is a schematic illustration of another embodiment of the invention.

FIG. 3 illustrates a simplified embodiment of the invention, with many parts common with the embodiment of FIG. 2. The same reference numerals will be used for the same parts.

It is to be noted, however, that in the embodiment of FIG. 3, there is only a single pressure vessel 10 which contains fuel such as methane or ethane, oxygen (or an oxidizing gas such as nitrous oxide) and inert gas, the inert gas being argon, helium or a mixture of these gases. The single pressure vessel 10 has a single outlet 12 connected by means of the electrically activated valve 14 to the inlet 15 of the combustion chamber 16, which again has the catalytic igniter 17. The combustion chamber 16 has an outlet 18 illustrated as being connected to an air-bag 19. Again an optional electric or pyrotechnic igniter 20 is provided associated with the inlet 15 to the combustion chamber 16.

In operation of the arrangement illustrated in FIG. 3, the electrically operated valve 14 will be opened permitting the pressurised gas within the pressure vessel 10 to flow into the combustion chamber 16. Combustion of the fuel will be initiated by the catalytic igniter 17 and, if the electric or pyrotechnic igniter 20 is provided, combustion will also be initiated by that igniter.

As in the arrangement illustrated in FIG. 2, gas under high pressure at an elevated temperature will flow through the outlet 18 to inflate the air-bag 19. The gas will not contain any significant quantities of carbon monoxide or hydrogen.

Figure 4:
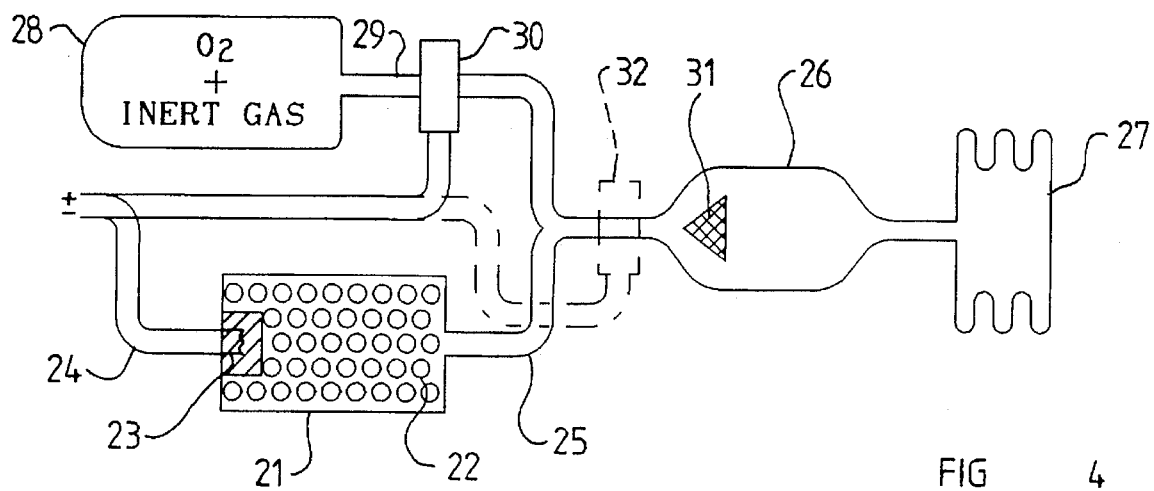
FIG. 4 is a schematic illustration of yet another embodiment of the invention.

Referring now to FIG. 4 of the drawings, a gas generator arrangement for inflating an air-bag comprises a housing 21 containing a pyrotechnic charge 22. The pyrotechnic charge may be of any appropriate pyrotechnic material which, when ignited, rapidly produces a large quantity of gas. The preferred pyrotechnic charge comprises a mixture of Nitrocellulose and Nitroglycerine which, when ignited, produces a mixture of gases which comprise 23% carbon dioxide, 15% nitrogen, 42% carbon monoxide and 20% hydrogen.

Contained within the housing 21 is an electrically triggered pyrotechnic igniter squib 23 which is connected to electric leads 24 which in turn are connected to a crash sensor (not shown). The arrangement is such that when a crash is sensed by the crash sensor an electric impulse is transmitted through the electric leads 24 to the igniter squib 23 which thus ignites the pyrotechnic material 22.

The housing 1 has an outlet conduit 25 which extends to a combustion chamber 26 (which will be described hereinafter), the combustion chamber 26 having an outlet leading directly to an air-bag 27. Consequently, when a crash is sensed by the crash sensor and the pyrotechnic material 22 is ignited, gas from the pyrotechnic material inflates the air-bag 27.

The described gas generating arrangement additionally includes a second housing in the form of a pressure vessel 28 which contains a compressed gas. At least part of the compressed gas comprises oxygen. It is preferred that the compressed gas also contains other inert gas and in one particular arrangement the vessel 28 contains 80% argon, 10% helium and 10% oxygen. It has been found that argon has good heat absorbing properties, whereas helium facilitates the detection of leaks.

An outlet port 29 from the pressure vessel is connected, through an electrically actuated valve 30 to the combustion chamber 26. The electrically actuated valve 30 is connected to the electric leads 24 which receive the signal from the crash sensor in such a way that when the crash sensor senses a crash the electrically controlled valve is opened.

Contained within the combustion chamber 26 is a catalytic igniter 31. The catalytic igniter comprises a catalytic inert metal, such as a metal selected from the group comprising platinum, osmium, iridium, palladium, rhodium and ruthenium supported on a porous substrate such as alumina, asbestos or silica. The preferred metal is platinum. The catalyst may be in the form of a thin film provided on the porous substrate, or may be present in the form of a block.

It is to be appreciated that in operation of the arrangement illustrated in FIG. 4, when the crash sensor senses a crash, the pyrotechnic charge 22 is ignited and also the electrically actuated valve is opened. The combustion gases from the pyrotechnic charge and the gas present within the pressure vessel are thus simultaneously directed towards the combustion chamber 26. The gas from the pyrotechnic charge is at an elevated temperature, and when mixed with the gas from the pressure vessel, which contains oxygen, the oxidisable components of the gas from the pyrotechnic charge are oxidized. The oxidation reaction commences immediately due to the high temperature of the gas. Thus the hydrogen burns to form water and the carbon monoxide is further oxidized to form a carbon dioxide. The catalytic igniter is provided as a back-up to ensure that the oxidation reactions do occur.

Consequently, the gas leaving the combustion chamber 26 is fully oxidized and does not contain any significant quantities of carbonmonoxide or hydrogen.

The embodiment of FIG. 4 may also be provided with an optional electric or pyrotechnic igniter 32.

Figure 5:
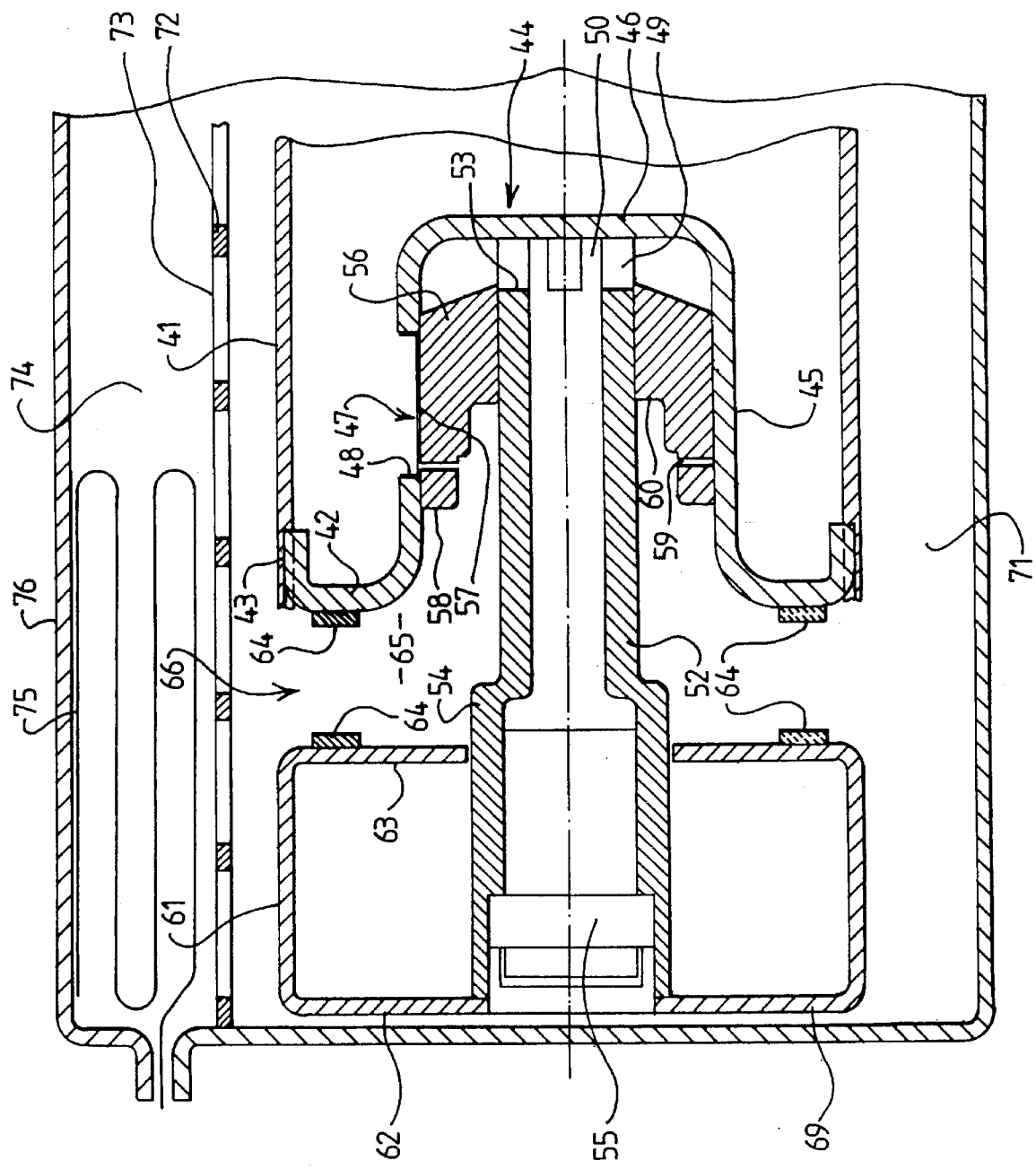
FIG. 5 is a cross-sectional view of the operative parts of a gas generator in accordance with another embodiment the invention, the gas generator being illustrated as part of an air bag unit.

Referring now to FIG. 5, an air bag unit incorporates a gas generator which comprises a first gas-containing gas bottle 41 of cylindrical form having one end closed by a closure plate 42 which is welded 43 or otherwise secured to the housing 41 of the gas bottle. The closure plate 42 is of circular form, but defines a central inwardly directed, or reentrant well 44, which is of circular cross-section. The well 44 effectively forms a cylindrical side wall 45 which is co-axial with the housing 41 but of a lesser radius, and also defines an end wall 46 forming the bottom of the well.

A plurality of apertures 47 are provided in the side wall 45 at equi-spaced positions, but only one aperture is shown in FIG. 5. The aperture is initially sealed by means of a sealing disc 48 formed of a relatively thin, but gas-tight material, such as aluminium foil, which may be soldered or welded in position.

A plurality of passages 49 are defined by projections 50 provided at the open end of a tubular flame-guide element 52. The projections 50 are provided at the end of a portion 53 of a first diameter. The tubular element has an enlarged end 54 remote from the portion 53, that enlarged end 54 containing an ignition squib 55.

A piston 56 is provided, mounted for sliding movement along the lesser diameter portion 53 of the tubular element 52. The piston provides a sliding substantially sealing fit within the well. The piston 56 has an initial position within the well 44. When in this position, a side wall 57 of the piston is located adjacent the foil element 48 sealing the aperture 47. The piston thus supports the foil element 48.

The piston has a rearwardly directed skirt 58 provided with a plurality of small diameter transverse bores 59 which form a flow path from a space 60 which is located on the interior of the skirt 58 of the piston, to the outer wall 57 of the piston.

Mounted on the enlarged diameter portion 54 of the tubular element 52 is a second gas-containing housing comprising a cylindrical side wall 61 carrying a first inwardly directed end wall 62 which is securely connected to the end of the enlarged diameter portion 54 of the tubular element 62 and a second inwardly directed end wall 63 which contacts the exterior of the enlarged diameter portion 54 of the tubular element 52 in a sealing manner.

Mounted on the part of the end cap 42 adjacent the housing 41 and also mounted on the end wall 63 of the second gas-containing housing are a plurality of elements 64 of a catalyst such as a catalytic inert metal. The elements may comprise blocks of platinum metal or other similar catalyst such as osmium, iridium, palladium, rhodium and ruthenium.

The metal catalyst may be mounted on a suitable porous substrate such as alumina, asbestos or a silicate.

The first gas-containing gas bottle 41, contains a mixture of inert gas, such as helium, and oxygen at a pressure of 200 bar. The quantity of helium may be adjusted between 0% and 50% of the total mixture. Thus, the gas bottle may contain pure oxygen.

The gas presses the sealing disc 48 against the side wall 57 of the piston. The piston supports the sealing disc 48. The disc 48 thus seals the aperture 47.

The second gas bottle, defined by the side wall 61 and the end walls 62,63 contains hydrogen at a pressure of 30 bar. Inert gas may, if desired, be combined with the hydrogen.

The space 65 between the end cap 42 and the end wall 63 forms a combustion zone. The outlet 66 of the combustion zone is an annular outlet located at the periphery of the space 65, in alignment with the cylindrical wall gas-containing housing 41 and the cylindrical wall 61 of the second gas-containing bottle. It is thus to be appreciated that the combustion space 65 is effectively of increasing cross-sectional area in a plane transverse to the longitudinal axis of the air bag unit from its interior, adjacent the tubular member 52, to its termination or outlet, i.e. the annular outlet 66 in alignment with the side wall of the gas bottle 41 and the side wall 61.

In operation of the gas generator as described with reference to FIG. 5, initially the squib 55 is ignited in response to a signal from an accident sensor. Gas generated from the squib passed down the tubular element 52, through the spaces 49 inbetween the projections 50 and the gas thus engages the end face of the piston 56. The piston 56 is thus driven to move towards the left as shown in FIG. 5, the piston thus reaching the position shown in FIG. 6. The movement of the piston has two effects.

Firstly, the side wall 57 of the piston 56 no longer supports the sealing disc 48 present in the aperture 47. The sealing disc 48 is thus subjected to a pressure of approximately 200 bars from the gas contained within the first gas bottle, but is no longer supported by the outer wall 57 of the piston 56. Whilst the sealing disc 48 was able to withstand the applied pressure when supported by the side wall 57 of the piston 56, when no longer supported the sealing disc ruptures thus permitting the helium and oxygen mixture to flow, as indicated by the arrow 67, from the interior of the gas bottle, through the aperture 47, past the tubular member 52, past the piston 56 and into the combustion chamber 65.

Secondly, the movement of the piston causes the skirt 58 of the piston to engage and deflect inwardly the end wall 63 of the gas bottle containing hydrogen. This opens a flow path between the end of the wall 63 and the exterior of the enlarged diameter portion 54 of the tubular member 52 for the hydrogen gas from within the second gas bottle. The hydrogen gas flows within the skirt 58 of the piston 56 and then flows through the radially extending bores 59 into the combustion space 65, as indicated by arrow 68. The hydrogen is thus mixed in the combustion space with the helium and oxygen gas. The resultant mixture is ignited by the catalyst element 64.

Because the combustion space 65 continually diverges towards its outlet 66 or, in other words, continually has an increasing cross-section as the gas advances towards the outlet 66, there is no restriction on the outlet, and thus the combusting gas is continually permitted to diverge and expand, obviating any risk of an explosion occurring.

The gas bottle as described above is mounted within the lower part of a housing 69. The end wall 62 of the second gas bottle is connected to a side wall of the housing 69. An aperture present in the side wall provides communication with the squib 55.

The outlet 66 of the combustion chamber communicates with an annular space 71 which surrounds the first gas bottle 41 and the side wall 61 of the second gas bottle.

A baffle 72 having apertures 73 bounds part of the annular space 71 and separates that space from a chamber 74 which contains a folded air bag 75. The chamber 74 is closed by a cover 76 which retains the folded air bag 75 in position. The cover 76 is connected to the housing 69.

The apertures 73 in the baffle 72 effectively form an inlet for the air bag.

It is to be noted that a flow path exists through the annular space 71 from the outlet 66 of the combustion space 65, to the baffle 72 and thus through the apertures 73 in the baffle to the inlet of the air bag 75. When the gas generator is activated, the gas flows along this flow path. The flow path is such that at each point on the flow path the cross-sectional area of the flow path in a plane transverse to the longitudinal axis of the air bag unit is at least equal to the cross-section of the outlet 66 of the combustion zone 65. Indeed, in the described embodiment, the cross-section of the flow path is non-decreasing from the outlet of the combustion zone to the inlet of the air bag.

Whilst the invention has been described with reference to particular embodiments, it is to be appreciated that many modifications may be effected without departing from the inventive concept defined by the following claims.

What is claimed is:

1. A gas generator for generating gas under pressure comprising:

means for providing a first gas including a pressure vessel containing the first gas, the first gas being an oxidizing gas;

means operatively connected with the means for providing a first gas for providing a second gas adapted to be oxidized by the first gas, the means for providing a second gas including a pyrotechnic charge for generating the second gas when ignited;

means for providing an oxidation zone operatively connected with the means for providing a first gas and the means for providing a second gas and including an outlet, the first gas and the second gas being adapted to undergo an oxidation reaction in the oxidation zone for generating the gas under pressure;

means operatively connected with the means for providing the oxidation zone for directing the first gas and the second gas to the oxidation zone such that oxidation zone contains a mixture of the first gas and the second gas for the oxidation reaction thereof, the second gas being of a sufficiently elevated temperature to initiate the oxidation reaction in the oxidation zone; and back-up catalytic means disposed in the oxidation zone for ensuring initiation of the oxidation reaction of the mixture in the oxidation zone.

2. The gas generator according to claim 1, wherein the pressure vessel contains a third gas, the third gas being an inert gas.

3. The gas generator according to claim 2, wherein the inert gas is selected from the group consisting of argon and helium.

4. The gas generator according to claim 1, further comprising:

a sensor operatively connected with the oxidation zone for generating a signal in response to a sudden deceleration; and valve means located between the pressure vessel and the oxidation zone, the valve means being adapted to be opened in response to the signal from the sensor for allowing the first gas to be introduced from the pressure vessel into the oxidation zone.

5. The gas generator according to claim 4, further comprising a squib operatively contacting the pyrotechnic charge for igniting the pyrotechnic charge, the squib being adapted to be activated in response to the signal from the sensor.

6. The gas generator according to claim 5, wherein the signal is an electrical signal.

7. The gas generator according to claim 1, wherein the catalytic means comprise a catalytic inert metal.

8. The gas generator according to claim 7, wherein the inert metal is selected from the group consisting of platinum, osmium, iridium, palladium, rhodium and ruthenium.

9. The gas generator according to claim 7, wherein the catalytic means comprise:

a catalyst; and a porous substrate for supporting the catalyst.

10. The gas generator according to claim 9, wherein the substrate comprises one of alumina, asbestos and silica.

11. A gas generator for generating gas under pressure comprising:

a first vessel containing a first gas, the first gas comprising oxygen;

a second vessel operatively connected with the first vessel and containing a second gas adapted to combust with oxygen;

means for providing a combustion zone operatively connected with the first vessel and the second vessel and including an outlet, the first gas and the second gas being adapted to undergo combustion in the combustion zone for generating the gas under pressure;

means operatively connected with the means for providing the combustion zone for directing the first gas and the second gas to the combustion zone;

an igniter operatively connected with the means for providing the combustion zone for activating the means for directing to direct the first gas and the second gas to the combustion zone for combustion thereof for generating the gas under pressure; and catalytic means disposed in the combustion zone for ensuring initiation of the combustion in the combustion zone.

12. The gas generator according to claim 11, wherein the catalytic means comprise a catalytic inert metal.

13. The gas generator according to claim 12, wherein the catalytic inert metal is selected from the group consisting of platinum, osmium, iridium, palladium, rhodium and ruthenium.

14. The gas generator according to claim 11, wherein the catalytic means comprise:

a catalyst; and a porous substrate for supporting the catalyst.

15. The gas generator according to claim 14, wherein the substrate comprises one of alumina, asbestos and silica.

16. The gas generator according to claim 11, wherein at least one of the first vessel and the second vessel includes:

an outlet portion including at least one outlet port comprising an aperture, the outlet portion defining an outlet region;

sealing means disposed on the aperture for sealing the aperture;

a piston disposed in the outlet region, the piston having an end face and being adapted to be disposed in both an opening position, and a closing position in which the piston is positioned adjacent to and in supporting relationship with respect to the sealing means; and means responsive to an activation of the igniter for moving the piston away from its closing position into its opening position in which the piston no longer supports the sealing means, a gas pressure within the at least one of the first vessel and the second vessel thereby breaking the sealing means when the piston is in its opening position for establishing a gas flow path to the combustion zone.

17. The gas generator according to claim 16, wherein the outlet portion is configured as a re-entrant well, the gas generator further comprising a tubular member having an interior and extending into the well, the piston being mounted for sliding movement on the tubular member such that there is a substantial sliding sealing fit of the piston within the well, the igniter being disposed to supply a third gas to the interior of the tubular member.

18. The gas generator according to claim 17, wherein the igniter is mounted within an end portion of the tubular member.

19. The gas generator according to claim 17, wherein the second vessel is mounted to surround a part of the tubular member projecting from the well.

20. The gas generator according to claim 19, wherein:

the second vessel has an end wall; and the piston further includes a peripheral skirt having a plurality of transverse bores therethrough, the skirt being adapted to deflect the end wall of the second vessel when the piston is in its opening position for opening a gas flow path from the end wall of the second vessel to the part of the tubular member projecting from the well on which the second vessel is mounted and thereafter through the transverse bores to the combustion zone.

21. The gas generator according to claim 11, wherein:

the first vessel contains a mixture of hydrogen and oxygen at a pressure of approximately 200 bar; and the second vessel contains hydrogen at a pressure of approximately 30 bar.

22. The gas generator according to claim 11, wherein an inert gas is present within at least one of the first vessel and the second vessel.

23. The gas generator according to claim 22, wherein the inert gas is helium.

* * * * *